United States Patent [19]

Elijah

[11] Patent Number: 4,541,229

[45] Date of Patent: Sep. 17, 1985

[54] CONTROL SYSTEM FOR COMBINE HEADER

[76] Inventor: Jerry D. Elijah, 209-8th St., Tipton, Iowa 52772

[21] Appl. No.: 508,247

[22] Filed: Jun. 27, 1983

[51] Int. Cl.⁴ ............................................ A01D 67/00
[52] U.S. Cl. ...................................... 56/10.2; 56/208; 56/DIG. 15
[58] Field of Search ................. 56/10.2, 208, DIG. 15

[56] References Cited

U.S. PATENT DOCUMENTS

| | | | |
|---|---|---|---|
| 3,163,974 | 1/1965 | Mack | 56/10.2 |
| 4,124,970 | 11/1978 | Bernhardt | 56/10.2 |
| 4,199,925 | 4/1980 | Quick et al. | 56/208 |
| 4,227,363 | 10/1980 | Kerber et al. | 56/208 |

OTHER PUBLICATIONS

ASAE Paper No. 81-1605, "An Automatic Pickup Header Height Controller for Combine Harvesters" by Kerley et al, Dec. 1981.

Primary Examiner—Robert P. Swiatek
Assistant Examiner—David L. Tarnoff
Attorney, Agent, or Firm—Zarley, McKee, Thomte, Voorhees & Sease; Zarley, McKee, Thomte, Voorhees & Sease

[57] ABSTRACT

The present invention comprises a control system for automatically controlling the height of a header on a combine. The combine header includes a cutter bar which is adapted to float upwardly and downwardly in response to variations in the terrain. A linkage interconnects the cutter bar with a movable cam and a microswitch so that the microswitch is actuated in response to upward and downward movement of the cutter bar. The microswitch is connected to solenoids within a hydraulic valve and the hydraulic valve is connected in the hydraulic system with the hydraulic cylinder for raising and lowering the header. When the cutter bar lifts upwardly the microswitches are moved to a condition wherein they cause the valve to actuate the hydraulic cylinder for lifting the header. Similarly when the cutter bar moves downwardly the hydraulic cylinder is actuated to lower the header. When the cutter bar is in a neutral position, the hydraulic cylinder remains motionless.

14 Claims, 5 Drawing Figures

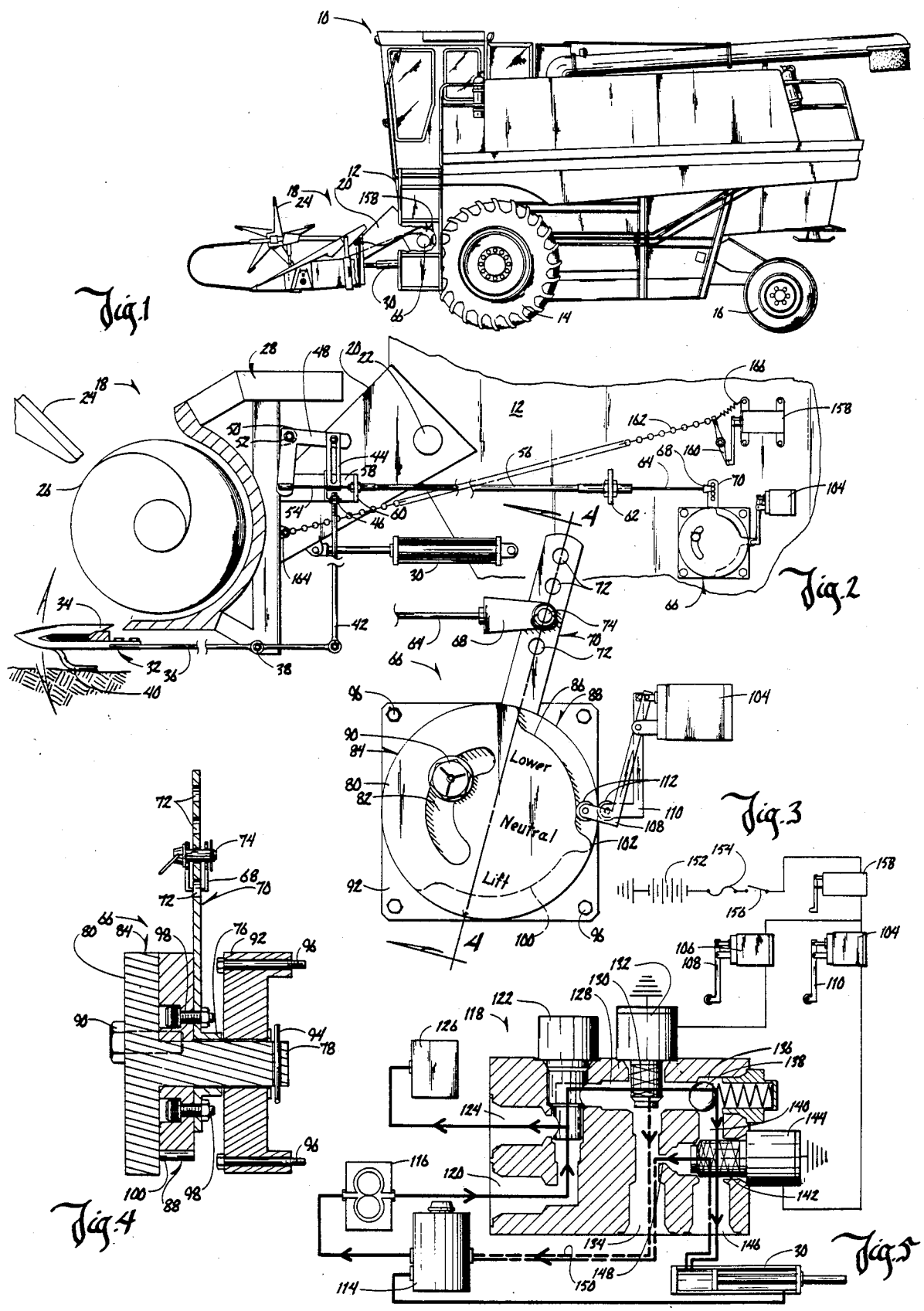

CONTROL SYSTEM FOR COMBINE HEADER

BACKGROUND OF THE INVENTION

This invention relates to an automatic control system for raising and lowering the header of a combine.

The combine header mounted on the front of a combine is usually moveably mounted so that a hydraulic cylinder or cylinders can be used to raise and lower the header as desired. The header includes a cutter bar which is positioned in close proximity to the ground. Various automatic control systems have been provided for causing the header to be raised and lowered in response to variations in the terrain of the ground. This permits the cutter bar to remain in close proximity to the ground without cutting into it or becoming buried in the ground.

Presently known devices for automatically controlling the height of the combine header generally include a linkage which is connected to the cutter bar at one end and which is connected to a hydraulic valve at the other end. As the cutter bar moves upwardly and downwardly the linkage causes movement of the hydraulic valve. The hydraulic valve is connected in a system with the cylinders for raising and lowering the combine header. Thus the hydraulic valve causes the hydraulic cylinders to raise and lower the combine header in response to the raising and lowering of the cutter bar.

This type of automatic control system has proved disadvantageous in that it is not adequately sensitive to changes in the terrain. Oftentimes the cutter bar becomes buried in the ground when the header encounters a rise or lump in the terrain. Furthermore, when the terrain includes a depression the cutter bar often is not dropped quickly enough. The result is that the particular crop being harvested is cut at a height much higher on the plant than is desirable. For example in the harvesting of soybeans, the cutter bars oftentimes will cut off the soybeans at a height above the lowermost pods on the stalk.

Therefore, a primary object of the present invention is the provision of an improved automatic control system for controlling the height of a combine header.

A further object of the present invention is the provision of a control system which provides quick and positive response to slight variations in the terrain over which the combine header is moving.

A further object of the present invention is the provision of an automatic control system which can be easily adapted with simple modification of the control systems presently used on combine headers.

Another object of the present invention is the provision of an automatic control device which permits easy adjustment of the sensitivity of the device to variations in the terrain.

A further object of the present invention is the provision of an automatic control device system which acts more quickly, is more accurate, and is easier to adjust than prior devices.

A further object of the present invention is the provision of a control device which permits the header to be removed and reinstalled without having to readjust any valve system.

A further object of the present invention is the provision of a device which can be utilized with and is compatible with the hydraulic systems and the electrical systems presently found on conventional combines.

A further object of the present invention is the provision of a device which is economical to manufacture, durable in use, and efficient in operation.

SUMMARY OF THE INVENTION

The present invention is adapted as a modification of the presently existing control systems for combine headers. In prior devices, the linking coming from the floating cutter bar was connected directly to the hydraulic valve. The present invention, instead of connecting the linkage directly to the hydraulic valve, connects the linkage to a cam and cam follower which operates microswitches. The microswitches are connected in electrical circuitry with a separate solenoid operated valve. Thus, the linkage need only move the microswitches in the present invention whereas the linkage was required to move the valve in the hydraulic system in prior devices.

The present invention includes solenoids which are connected to valves in a central valve system. These valves are moved quickly by the electrical circuitry and therefore respond quickly and positively to the changes in the movement of the cutter bar.

The present invention utilizes a circular cam which is adjustable so as to permit adjustment of the sensitivity of the device. It is desirable to keep the hydraulic cylinder stationary when the cutter bar is encountering normal vibration on level terrain. However, when the cutter bar drops as a result of a dip in the terrain, the control system must react quickly. Similarly when the cutter bar rises in response to a hill or lump in the terrain the control system must also respond quickly. Therefore, adjustment of the cams is possible so as to cause the microswitches to be activated only when the cutter bar has moved within a desired tolerance or a range of movement.

BRIEF DESCRIPTION OF THE DRAWINGS

FIG. 1 is a side elevational view of a combine showing portions of the header broken away so as to reveal the control system of the present invention.

FIG. 2 is a detailed sectional view showing the interrelationship of the various linkages and parts of the control system.

FIG. 3 is a detailed elevational view of the cam and microswitches for the present control system.

FIG. 4 is a sectional view taken along line 4—4 of FIG. 3.

FIG. 5 is a schematic diagram of the control system of the present invention.

DETAILED DESCRIPTION OF THE PREFERRED EMBODIMENT

Referring to the drawings, the numeral 10 generally designates a combine. Combine 10 includes a body 12 supported by wheels 14 and 16. A combine header 18 is pivotally mounted to body 12 by means of a header boom 20 which is pivotally mounted to body 12 for pivotal movement about an axis 22. Header 18 includes a reel assembly 24, and auger assembly 26 and a header frame 28, all of which are conventional.

Header frame 28 is supported by means of a header control hydraulic cylinder 30 which is connected at one end to body 12 and which is connected at the other end to boom 20 adjacent header frame 28. Expansion of cylinder 30 causes header frame 28 to lift and retraction of cylinder 30 causes header frame 28 to lower.

Pivotally mounted to the lower end of header frame 28 is a cutter bar assembly 32 which includes a cutter bar 34 mounted to the forward end of a cutter bar rod 36. Cutter bar rod 36 is pivoted intermediate its length to header frame 28 for pivotal movement about axis 38. A slide 40 is mounted to the under surface of cutter bar 34 and is adapted to slidably engage the ground so that cutter bar 34 rides along the ground. As the terrain of the ground elevates, cutter bar 34 also elevates, pivoting about axis 38. Similarly, as the terrain lowers, the cutter bar 34 lowers also pivoting again about axis 38. The rearward end of cutter bar rod 36 is connected to a sensing rod 42 which extends upwardly and is connected to an adjustment bracket 44 by means of a nut 46. Bracket 44 is connected to an L-shaped link 48 which is pivotally mounted to an ear flange 50 on header frame 28 for pivotal movement about axis 52. Connected to one end of L-shaped link 48 is a flexible cable 54 which extends through a cable sleeve 56. Cable sleeve 56 is attached to a bracket 58 on header frame 28 by means of a sleeve bracket 60. Similarly another sleeve bracket 62 holds the rearward end of sleeve 56 to body 12 of combine 10. The rearward end 64 of cable 54 protrudes outwardly from sleeve 56 and is slidable in response to upward and downward movement of cutter bar 34.

All of the above structure is conventional in presently known combines. The present invention contemplates attaching a rotary cam assembly 66 to rearward end 64 of cable 54 by means of a clevis 68. Cam assembly 66 includes a lever arm 70 having a plurality of holes 72 therein for receiving a pin 74 so as to attach clevis 68 to lever arm 70. The lower end of lever arm 70 has a sleeve bushing 76 (FIG. 4) therein. Extending through sleeve bushing 76 is an axle 78 which is connected to a circular cam plate 80. Cam plate 80 includes an arcuate slot 82 therein. Also cam plate 80 includes an outer cam surface which includes a circular portion 84 and a recessed portion 86. A second circular cam plate 88 is identical in size to circular cam plate 80 and is fitted over axle 78 so as to fit between sleeve 76 of link 70 and circulate plate 80 as shown in FIG. 4. An adjustment bolt 90 protrudes through slot 82 and is threadably received in a threaded opening in plate 88. By loosening bolt 90 it is possible to rotate plates 80 and 88 with respect to one another. However, when bolt 90 is tightened then plates 80, 88 are fixed with respect to one another. Axle 78 rotatably extends through a mounting plate 92 where it is attached by means of a locking ring 94. Mounting plate 92 is adapted to be mounted to the body 12 of the combine 10 by means of threaded bolts 96.

Lever arm 70 is fixed to plate 88 by means of a pair of bolts 98.

Circular plate 88 has a circular surface and a depression 100 similar to the circular surface 84 and depression 86 of plate 80. The relative positions of plates 80, 88 is shown in FIG. 3. The respective depressions 86, 100 are adjusted so that their ends are touching. In combination depressed slots 86, 100 and the juncture therebetween provide essentially three cam surfaces. The first cam surface is provided by depression 86; the second cam surface is provided by the juncture 102 between depressions 86, 100; and the third cam surface is provided by the depression 100. By loosening bolt 90 it is possible to either widen or narrow the juncture 102 between the two depressions 86, 100. Since juncture 102 provides the neutral position wherein the header remains stationary, it may be desirable to widen this depression slightly so that a certain tolerance in variation of the terrain will be permissible without actuation of the hydraulic cylinder for raising and lowering the header.

A pair of microswitches 104, 106 each include a pivoting actuating arm 108,110 respectively. Each actuator arm terminates in a roller 112 adapted to roll against the outer surfaces of plates 80 and 88. The roller 112 of arm 108 rolls on the outer surface of plate 80 and the roller 112 of arm 110 rolls on the outer surface of plate 88.

Switches 104, 106 are normally in an open position when they are riding on the juncture 102 or on the outer circular surfaces of plates 80, 88. However, whenever roller 112 of arm 108 falls within depression 86 of plate 80, this causes switch 104 to change from its off condition to its on condition. Similarly, when roller 112 of arm 110 rolls into depression 100, it causes switch 106 to change from its off to its on condition. In the position shown in FIG. 3, switch 106 and its corresponding arm 110 are in the off position whereas switch 104 and its corresponding arm 108 are in the on position. When rollers 112 of both arms 108, 110 are located adjacent juncture 102, both switches 104 and 106 are in their off position. When rollers 112 of arms 108, 110 are located adjacent depression 100, then switch 110 is on and switch 108 is off.

Referring to the schematic diagram of FIG. 5, the hydraulic circuitry for the lifting cylinder 30 is shown. The circuitry includes a reservoir 114 connected to a hydraulic pump 116 which is the hydraulic pump located on presently existing combines. This hydraulic pump is adapted to have an output of approximately 11 gallons per minute.

Connected to pump 116 is a control valve assembly 118, which includes an inlet passageway 120 for receiving the 11 gallons per minute from pump 116. Interposed in the upper end of passageway 120 is a flow divider 122 which produces a flow of seven gallons per minute outwardly through an outlet passageway 124. Passageway 124 is connected to the existing flow divider 126 for operating the reel assembly 24 (FIG. 1).

Flow divider 122 sends a priority flow of four gallons per minute through a connecting passageway 128 to a first valve 130. Valve 130 is operated by an electrical solenoid 132. Valve 130 has a first position which is its normal position, permitting fluid to pass from passageway 128 to a return passageway 134 which is connected to reservoir 114 and which permits the four gallons per minute to return to the reservoir. However, upon actuation of solenoid 132, valve 130 moves to its second position which prevents fluid from entering return passageway 134 and which instead directs fluid to a check valve chamber 136 having a check valve 138 therein. Check valve 138 permits fluid to pass on through a connecting passageway 140 which contains a second valve 142 which is operated by solenoid 144. Valve 142 is normally in a first position which permits fluid to pass from connecting passageway 140 to a cylinder passageway 146. Valve 142 prevents fluid from re-entering a return connecting orifice 148 which leads to return passageway 134 and reservoir 114.

When solenoid 144 is actuated, valve 142 changes to a second position which permits fluid to escape from cylinder 30 backwardly through cylinder passageway 146 and through return orifice 148 into return passage 134.

It should be noted that because of the relative positions of plates 80, 88, solenoids 132, 144, are never actuated at the same time. The solenoid 144 is actuated when switch 104 and its arm 108 are within depression 86, but at that time solenoid 132 is deactuated. When arms 108, 110 are engaging juncture 102 of the cam plates, both solenoids 132, 144 are off, and when arm 110 is within depression 100, solenoid 132 is on and solenoid 144 is off.

During normal operation on level terrain, cutter bar 34 is in the position shown in FIG. 2, and in this position both rollers 112 of arms 108, 110 are located at juncture 102. In this normal position, solenoids 132, 144 are both off. The line of fluid flow through valve assembly 118 is as follows. The fluid enters inlet passageway 120 and encounters flow divider 122. Seven gallons per minute of flow is directed towards flow divider 126 for the reel assembly and four gallons per minute is directed towards valve 130. Valve 130 in its deactuated state directs the fluid downwardly through return passageway 134 to reservoir 114 as indicated by dotted line 150. With the switches 104, 106 both in the neutral position of FIG. 2, valve 142 is in its normal deactuated position which blocks any passage of fluid from cylinder 30 through return orifice 148. Check valve 138 also prevents fluid from passing backwardly to valve 132. This causes cylinder 30 to remain stationary and be positively held against movement.

Referring to FIG. 3, the switches 104, 106 are shown to be located in the position which will result in lowering of the header. This occurs when cutter bar 34 drops downwardly in response to the lowering of the terrain. As cutter bar 34 drops, it causes second end 64 of cable 54 to move to the right as viewed in FIG. 3, thereby causing the cams to be in the position shown in FIG. 3.

In the position shown in FIG. 3, switch 106 is in its deactuated condition and switch 104 is in its actuated position. This causes solenoid 132 to be deactuated thereby diverting the fluid to the return passageway 134 as indicated by arrow 150. Solenoid 144, however, is actuated by switch 104 and this causes valve 142 to move to its second position which opens orifice 148 and permits fluid to drain from cylinder 30 upwardly through cylinder passageway 146 and outwardly through orifice 148 into return passageway 150. This permits the header to move downwardly by virtue of its own weight acting on cylinder 30.

When the cutter bar 34 encounters a hill or rise in the terrain, it is lifted upwardly and this causes cam plates 80, 88 to rotate in a counterclockwise direction as viewed in FIG. 3 until the switches 104, 106 are in the position labeled "lift" on the drawings. In this position, switch 104 rides on the outer convex surface and is in off position whereas switch 106 rides downwardly in depression 100 and is moved to an on position. This results in solenoid 132 being turned on and in solenoid 144 being off. In this position, fluid is permitted to pass through valve 130 into check valve chamber 136 and thence downwardly through passageway 140, through valve 142 and through cylinder passageway 146 where it is introduced to the left side of cylinder 30. This results in cylinder 30 being actuated to lift the header.

The circuitry for controlling switches 104, 106 includes a power source 152, preferably the battery of the combine, a fuse 154 which protects the electrical system of the combine against damage, a master toggle switch 156 which is in the cab of the vehicle, and a master kick in switch 158. Switch 158 is shown in both FIGS. 2 and 1. It is mounted on the vehicle frame and is controlled by a link 160 which in turn is connected to a chain 162. Chain 162 is connected to boom 20 and 164. The purpose of master switch 158 is to keep the electrical system, shown in FIG. 5, from being on until the header is lowered to within one foot of the ground. At this level, chain 162 pulls link 160 (which is biased in a clockwise direction by spring 166) so that it rotates against the bias of spring 166 and turns switch 158 on. This actuates the entire electrical system and puts it in an operative condition. When the header is lifted above the one foot level, it is controlled by an override hydraulic system which actuates cylinders 30, and this override system is not shown in the drawings.

The present invention has been found to be a significant improvement over the control systems of prior devices. It provides quick and positive controlled movement of the header so that the header can closely follow the terrain as the combine moves through the field. It minimizes the gouging of the cutter bar into the ground and it also minimizes the cutter bar engaging the crops at a level higher than desired. The system is simple and easy to incorporate into presently existing systems. The only modification required is the connecting of the rotary cam assembly 66 and the microswitches 104, 106 to the second end 64 of cable 54. Next, all that is required is the insertion of the control valve assembly 118 into the hydraulic system for the cylinders. The device is simple to manufacture, economical to use, and efficient in operation. Thus, it can be seen that the device accomplishes at least all of its stated objectives.

What is claimed is:

1. An improved control device for use with a combine having vehicle body, a header assembly movably mounted to said body and carrying a cutter bar, said cutter bar being movably mounted on said header assembly so as to be able to slidably engage the ground and rise and fall with changes in the terrain of the ground from a lowered position to a neutral position to an elevated position; hydraulic power means connected to said header assembly for raising and lowering said header assembly with respect to the ground; and linkage mechanism having a first end connected to said cutter bar and having a second end movable in response to movement of said cutter bar between said lowered, neutral, and elevated position; said improved control device comprising:

hydraulic pump means, valve means, and reservoir means hydraulically connected to said hydraulic power means;

said valve means having a first position for causing said power means to lower said header assembly, a second position for causing said power means to hold said header assembly stationary, and a third position for causing said power means to lift said header assembly:

electrical power means connected to said valve means for moving said valve means between said first, second and third positions;

electrical switch means connected to said electrical power means, said switch means being movable between first, second and third conditions for causing actuation of said power means to move said valve means to said first, second and third positions, respectively; and a movable cam and cam follower means mounted on said vehicle body between said switch means and said second end of said linkage mechanism for causing said switch means to move to said first, second and third conditions in response to movement of said cutter bar to said lowered position, neutral position, and elevated position respectively, whereby said hydraulic power means will lower said header assembly, hold said header assembly stationary, and raise said header assembly in response to said cutter bar being in its lower position, neutral position and elevated position respectively;

said cam comprising a cam wheel having a cam surface thereon, said cam wheel being mounted to said vehicle body and having a lever arm attached to said second end of said linkage mechanism, said cam follower means engaging said cam surface and being operatively connected to said switch means;

said cam surface including first, second and third portions, each of which when engaged by said cam follower means, causes said switch means to be in said first, second and third conditions respectively, each of said first, second and third portions of said cam surface having predetermined lengths;

said cam means being adjustable to permit selective adjustment of the length of said second portion of said cam surface.

2. An improvement according to claim 1 wherein said cam comprises a cam wheel having a cam surface thereon, and having a lever arm attached to said second end of said linkage mechanism.

3. An improvement according to claim 2 wherein said cam follower means engages said cam surface, said cam follower means being operatively connected to said switch means.

4. An improvement according to claim 3 wherein said cam surface includes first, second and third portions, each of which when engaged by said cam follower means, causes said switch means to be in said first, second and third conditions respectively.

5. An improvement according to claim 1 wherein said electrical power means comprise two solenoids.

6. An improvement according to claim 5 wherein said switch means comprise two microswitches, each of which is connected to one of said solenoids.

7. An improvement according to claim 6 wherein said cam follower means comprises a pair of lever arms, one of which is connected to one of said microswitches and the other of which is connected to the other of said switches.

8. An improvement according to claim 7 wherein said cam follower means comprise a pair of rollers, each of which is rotatably mounted to one of said lever arms and each of which engages said cam surface for rolling movement thereon.

9. An improvement according to claim 8 wherein said cam surface comprises a first track receiving one of said pairs of rollers and a second track receiving the other of said rollers.

10. An improvement according to claim 9 wherein said cam wheel comprises first and second circular cam plates fastened together in face to face relation, said first and second tracks being on the outside surfaces of said first and second circular plates respectively.

11. An improvement according to claim 10 wherein adjustable securing means hold said first and second plates together, said adjustable securing means being selectively adjustable to change the relative position of said first and second tracks with respect to one another.

12. An improved control device for use with a combine having vehicle body, a header assembly movably mounted to said body and carrying a cutter bar, said cutter bar being movably mounted on said header assembly so as to be able to slidably engage the ground and rise and fall with changes in the terrain of the ground from a lowered position to a neutral position to an elevated position; hydraulic power means connected to said header assembly for raising and lowering said header assembly with respect to the ground; and linkage mechanism having a first end connected to said cutter bar and having a second end movable in response to movement of said cutter bar between said lowered, neutral, and elevated position; said improved control device comprising:

hydraulic pump means, valve means, and reservoir means hydraulically connected to said hydraulic power means;

said valve means having a first position for causing said power means to lower said header assembly, a second position for causing said power means to hold said header assembly stationary, and a third position for causing said power means to lift said header assembly;

electrical power means connected to said valve means for moving said valve means between said first, second and third positions;

electrical switch means connected to said electrical power means, said switch means being movable between first, second and third conditions for causing actuation of said power means to move said valve means to said first, second, and third positions, respectively; and a movable cam and cam follower means between said switch means and said second end of said linkage mechanism for causing said switch means to move to said first, second and third conditions in response to movement of said cutter bar to said lowered position, neutral position, and elevated position respectively, whereby said hydraulic power means will lower said header assembly, hold said header assembly stationary, and raise said header assembly in response to said cutter bar being in its lower position, neutral position and elevated position respectively;

said cam comprising a cam wheel having a cam surface thereon, said cam wheel being mounted to said vehicle body and having a lever arm attached to said second end of said linkage mechanism;

said cam follower means engaging said cam surface, said cam follower means being operatively connected to said switch means;

said cam surface including first, second and third portions, each of which when engaged by said cam follower means, causing said switch means to be in said first, second and third conditions, respectively;

said first, second and third portions of said cam surface each having predetermined lengths, said cam means being adjustable to permit selective adjustment of the length of said second portion of said cam surface.

13. An improved control device for use with a combine having vehicle body, a header assembly movably mounted to said body and carrying a cutter bar, said cutter bar being movably mounted on said header assembly so as to be able to slidably engage the ground and rise and fall with changes in the terrain of the ground from a lowered position to a neutral position to an elevated position; hydraulic power means connected to said header assembly for raising and lowering said header assembly with respect to the ground; the linkage mechanism having a first end connected to said cutter bar and having a second end movable in response to movement of said cutter bar between said lowered, neutral, and elevated position; said improved control device comprising:

hydraulic pump means, valve means, and reservoir means hydraulically connected to said hydraulic power means;

said valve means having a first position for causing said power means to lower said header assembly, a second position for causing said power means to hold said header assembly stationary, and a third position for causing said power means to lift said header assembly;

electrical power means connected to said valve means for moving said valve means between said first, second, and third positions;

electrical switch means connected to said electrical power means, said switch means being movable between first, second and third conditions for causing actuation of said power means to move said valve means to said first, second and third positions, respectively; and a movable cam and cam follower means between said switch means and said second end of said linkage mechanism for causing said switch means to move to said first, second and third conditions in response to movement of said cutter bar to said lowered position, neutral position, and elevated position respectively, whereby said hydraulic power means will lower said header assembly, hold said header assembly stationary, and raise said header assembly in response to said cutter bar being in its lower position, neutral position and elevated position respectively;

said electrical power means comprising two solenoids;

said switch means comprising two microswitches, each of which is connected to one of said solenoids;

said cam follower means comprising a pair of lever arms, one of which is connected to one of said microswitches and the other of which is connected to the other of said switches;

said cam follower means further comprising a pair of rollers, each of which is rotatably mounted to one of said lever arms and each of which engages said cam surface for rolling movement thereon;

said cam surface comprising a first track receiving one of said pairs of rollers and a second track receiving the other of said rollers;

said cam wheel comprising first and second circular cam plates fastened together in face to face relation, said first and second tracks being on the outside surfaces of said first and second circular plates respectively.

14. An improvement according to claim 13 wherein adjustable securing means hold said first and second plates together, said adjustable securing means being selectively adjustable to change the relative position of said first and second tracks with respect to one another.

* * * * *